United States Patent
Kuwajima et al.

(10) Patent No.: US 11,625,561 B2
(45) Date of Patent: Apr. 11, 2023

(54) INFERENCE DEVICE, INFERENCE METHOD, AND NON-TRANSITORY TANGIBLE COMPUTER-READABLE MEDIUM

(71) Applicant: DENSO CORPORATION, Kariya (JP)

(72) Inventors: Hiroshi Kuwajima, Kariya (JP); Masayuki Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 395 days.

(21) Appl. No.: 16/860,843

(22) Filed: Apr. 28, 2020

(65) Prior Publication Data

US 2020/0257925 A1  Aug. 13, 2020

Related U.S. Application Data

(63) Continuation of application No. PCT/JP2018/032689, filed on Sep. 4, 2018.

(30) Foreign Application Priority Data

Oct. 31, 2017 (JP) .............................. JP2017-210178

(51) Int. Cl.
 G06K 9/62 (2022.01)
 G06N 20/00 (2019.01)
 G06N 5/02 (2006.01)

(52) U.S. Cl.
 CPC ............... G06K 9/628 (2013.01); G06N 5/02 (2013.01); G06N 20/00 (2019.01)

(58) Field of Classification Search
 CPC ........ G06N 5/02; G06N 20/00; G06N 3/0427; G06N 3/0454; G06V 10/454; G06V 10/771; G06V 10/82
 See application file for complete search history.

(56) References Cited

U.S. PATENT DOCUMENTS

2012/0301032 A1* 11/2012 Kawanishi ............ G06F 16/583
                                                    382/190
2020/0034659 A1*  1/2020 Sato ...................... G06V 40/23

FOREIGN PATENT DOCUMENTS

CN      105740842 B  * 10/2018
JP      2005037992 A *  2/2005
                (Continued)

OTHER PUBLICATIONS

Sakitsu et al., "Automatic generation of description of data classification process by decision tree and decision network", The 29th Annual Conference of the Japanese Society for Artificial Intelligence, 2015. (Year: 2015).*

(Continued)

Primary Examiner — Anne L Thomas-Homescu
(74) Attorney, Agent, or Firm — Harness, Dickey & Pierce, P.L.C.

(57) ABSTRACT

A method for determining a class to which an input image belongs in an inference process, includes: storing a frequent feature for each class in a frequent feature database; inputting an image as the input image; extracting which class the input image belongs to; extracting a plurality of features that appear in the inference process; extracting one of the features that satisfies a predetermined condition as a representative feature; reading out the frequent feature corresponding to an extracted class from the frequent feature database; extracting one or a plurality of ground features based on the frequent feature and the representative feature; storing a concept data representing each feature in an annotation database; reading out the concept data corresponding to the one or the plurality of ground features from the annotation database; generating explanation information; and outputting the ground feature and the explanatory information together with the extracted class.

15 Claims, 8 Drawing Sheets

(56) References Cited

FOREIGN PATENT DOCUMENTS

| JP | 2006-043007 | A  |   | 2/2006 |           |
|----|-------------|----|---|--------|-----------|
| JP | 4247362     | B2 | * | 4/2009 |           |
| JP | 4624594     | B2 | * | 2/2011 | G06K 9/6293 |

OTHER PUBLICATIONS

Kobayashi et al., "Visualization of the image classification process of the evolutionary condition judgment network", IPSJ SIG Technical Report, 2016. (Year: 2016).*

Ribeiro et al., ""Why Should I Trust You?" Explaining the Predictions of Any Classifier", ACM, 2016 (Year: 2016).*

Turek, Dr. Matt, "Explainable Artificial Intelligence (XAI)"; Defense Advanced Research Projects Agency Program Information (3 pages). NIKKEI Technology, NIKKEI Business Publications, Inc., Jun. 9, 2017.

Escorcia, Victor, et al. "On the Relationship between Visual Attributes and Convolutional Networks", Computer Vision Foundation, 2015, pp. 1256-1264.

Hendricks, Lisa Anne, et al.,"Generating Visual Explanations", arXiv:1603.08507v1, [cs.CV] Mar. 28, 2016, pp. 1-17.

Sakitsu, Miho, et al., "Automatic Generation of Sentences Explaining Image Classification Processes Constucted by Decision Tree and Decision Network", Information Processing Society of Japan, vol. 9, No. 1, Feb. 2016, pp. 43-52.

Kobayashi, Masayuki, et al., "Visualizing Evolutionary Decision Network Process for Image Classification", Information Processing Society of Japan, SIG Technical Reports, Nov. 27, 2018, pp. 1-7.

Kobayashi, Masayuki et al., "Visualizing Evolutionary Decision Network Process for Image Classification", 2016 Information Processing Society of Japan, vol. 2016-MPS-108, No. 1.

* cited by examiner

INFERENCE DEVICE, INFERENCE METHOD, AND NON-TRANSITORY TANGIBLE COMPUTER-READABLE MEDIUM

CROSS REFERENCE TO RELATED APPLICATION

The present application is a continuation application of International Patent Application No. PCT/JP2018/032689 filed on Sep. 4, 2018, which designated the U.S. and claims the benefit of priority from Japanese Patent Application No. 2017-210178 filed on Oct. 31, 2017. The entire disclosures of all of the above applications are incorporated herein by reference.

TECHNICAL FIELD

The present disclosure relates to an inference device, an inference method, and a non-transitory tangible computer-readable medium.

BACKGROUND

In an image recognition contest called the Large-Scale Visual Recognition Challenge (ImageNet database operated by Stanford University), machine learning systems using deep learning have been triumphed, and research on machine learning systems has been actively conducted. In recent years, machine learning systems have become extremely sophisticated, and applications to security and autonomous driving vehicles, for example, are being studied.

SUMMARY

According to an example embodiment, a method for determining a class to which an input image belongs in an inference process, includes: storing a frequent feature for each class in a frequent feature database; inputting an image as the input image; extracting which class the input image belongs to; extracting a plurality of features that appear in the inference process; extracting one of the features that satisfies a predetermined condition as a representative feature; reading out the frequent feature corresponding to an extracted class from the frequent feature database; extracting one or a plurality of ground features based on the frequent feature and the representative feature; storing a concept data representing each feature in an annotation database; reading out the concept data corresponding to the one or the plurality of ground features from the annotation database; generating explanation information; and outputting the ground feature and the explanatory information together with the extracted class.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A difficulty has been pointed out that the process of reaching the recognition result in the machine learning system is a black box. Several studies have been started to solve this difficulty.

According to example embodiments, an inference device, an inference method, and a non-transitory tangible computer-readable medium are provided for explaining an inference process in machine learning or deep learning.

According to example embodiments, an inference device that infers which of predetermined classes input information belongs to using an inference model generated by machine learning, the inference device includes: an input unit that inputs the information; a frequent feature database that stores a feature, frequently appeared in an inference process using the inference model, as a frequent feature in each class; an inference unit that infers which class the input information belongs to, using the inference model; a representative feature extraction unit that extracts features appeared in the inference process in the inference unit, and extracts one of the features satisfying a predetermined condition as a representative feature; a ground feature calculation unit that reads out the frequent feature corresponding to an inferred class from the frequent feature database, and extracts one or more ground features based on the frequent feature and the representative feature; and an output unit that outputs the one or more ground features together with the inferred class.

Here, the ground feature is a feature considered to be a ground for determining that the input information belongs to a certain class. With the above-described inference device, it is possible to obtain the ground feature that is a ground for deriving an inference result based on a representative feature that appears in an inferring process and a frequent feature that is included in information of an inferred class.

Alternatively, the inference device further includes: an annotation database that stores concept data representing the feature; and an explanation information generating unit that reads out concept data corresponding to the ground feature from the annotation database, and generates explanation information. The output unit outputs the explanation information together with the inferred class. In this case, by displaying the explanation information generated based on the concept data corresponding to the ground feature together with the class as the inference result, the user can easily grasp the ground that leads to the inference result.

Alternatively, the input unit may receive an image input as information. The ground feature extracting unit extracts data of a receptive field in the image corresponding to the ground feature together with the ground feature. The output unit performs displaying to specify the receptive field corresponding to the ground feature in the image. In this case, by displaying and specifying the receptive field corresponding to the ground feature in the image, it is possible to easily understand a characteristic of which part of the image the ground feature describes, and thereby, to grasp concretely the ground leading to an inference result.

Alternatively, the ground feature calculation unit may use the data of the receptive field to obtain the ground feature relating to a receptive field in a different region. In this case, since the ground feature for the receptive field in the different region is shown, it is possible for the user to understand that the inference has been made by widely capturing the image.

Alternatively, the output unit may arrange and display the ground features in a descending order of a strength in the representative feature corresponding to the ground feature. In this case, as a basis for the inference, a feature matching the image is likely to be displayed at a higher rank.

Alternatively, the output unit may display the ground features side by side based on the frequent features and the representative features corresponding to the ground features. In this case, since the ground features are arranged using the features frequently appearing in the image in the inferred class, a feature often appeared in the class is displayed at a higher rank.

Alternatively, attribute data may be stored in the annotation database in association with the concept data. The ground feature calculation unit obtains ground features for different attributes using the attribute data. In this case, since the ground features for the different attributes are shown, it is possible for the user to understand that the inference has been made by capturing the information in view of various aspects.

Alternatively, the output unit may output a notification when the number of ground features is equal to or less than a predetermined threshold. When the number of ground features is equal to or smaller than a predetermined threshold, the inference result may be incorrect. In this case, the configuration of the present disclosure can alert about the inference result.

Alternatively, the inference device further includes a ground feature storage unit that stores data of the ground feature calculated by the ground feature calculation unit for each class, and a clustering unit that clusters the ground feature stored in the ground feature storage unit. The output unit outputs a notification that the ground feature can be classified by the clustering unit. In this case, it is possible to give a notice about the possibility that a new class exists.

According to example embodiments, an inference device that infers which of predetermined classes an input image belongs to using an inference model generated by machine learning, the inference device includes: an input unit that inputs an image; an inference unit that infers which class the input image belongs to using the inference model; and an output unit that outputs a feature, which is a basis for determining that the image belongs to the class, together with the inferred class.

With the above-described inference device, it is possible to easily grasp the basis that leads to the inference result.

Alternatively, the output unit may display for specifying the receptive field corresponding to the feature in the image together with the feature. In this case, it is easy to understand which part of the image the feature describes, and to grasp concretely the ground for the inference result.

Alternatively, the output unit may output the ground features for receptive fields in different regions. In this case, it is possible for the user to understand that the inference has been made by capturing the image widely.

According to example embodiments, an inference method by an inference device for inferring which of predetermined classes input information belongs to using an inference model generated by machine learning, the method includes: by the inference device, inferring which class the input information belongs to using an inference model generated by machine learning; by the inference device, extracting a feature appearing in an inference process and extracting one of features that satisfies a predetermined condition as a representative feature; by the inference device, reading out a frequent feature corresponding to an inferred class from a frequent feature database storing a feature, appearing in the inference process using the inference model, as the frequent feature for each class; by the inference device, extracting one or more ground features based on the frequent feature and the representative feature; and, by the inference device, outputting the ground feature together with the inferred class.

According to the above-described inference method, it is possible to output the feature that is the basis of the inference together with the inference result.

According to example embodiments, a program for inferring which of predetermined classes the input information belongs to using an inference model generated by machine learning, the program causing a computer to: infer which class the input information belongs to using the inference model; extract a feature appearing in an inference process and extract a feature satisfying a predetermined condition among features as a representative feature; read out a frequent feature corresponding to an inferred class from a frequent feature database storing frequent features frequently appearing in the inferring process using the inference model for each class; extract one or more ground features based on the frequent feature and the representative feature; and output the ground feature together with the inferred class.

According to the above-described program, it is possible to output the feature that is the basis of the inference together with the inference result.

According to example embodiments, a non-transitory tangible computer readable medium includes instructions being executed by a computer, the instructions provide a method by an inference device for inferring which of predetermined classes input information belongs to using an inference model generated by machine learning, and the instructions include: by the inference device, inferring which class the input information belongs to using an inference model generated by machine learning; by the inference device, extracting a feature appearing in an inference process and extracting one of features that satisfies a predetermined condition as a representative feature; by the inference device, reading out a frequent feature corresponding to an inferred class from a frequent feature database storing a feature, appearing in the inference process using the inference model, as the frequent feature for each class; by the inference device, extracting one or more ground features based on the frequent feature and the representative feature; and, by the inference device, outputting the ground feature together with the inferred class.

According to the above-mentioned non-transitory tangible computer-readable medium, it is possible to output the feature that is the basis of the inference together with the inference result.

Hereinafter, an inference device according to an embodiment of the present disclosure will be described with reference to the drawings. In the embodiment described below, as an inference device, an image recognition device with a neural network for classifying images will be described. Alternatively, the inference device of the present disclosure is not limited to image recognition. For example, it is widely applicable to voice recognition, estimation of weather and traffic congestion, and the like using the neural network. Further, in the embodiment, an example in which a neural network is used as machine learning will be described. Alternatively, the inference device according to the present disclosure may be applied to a machine learning method in which the strength of a feature is calculated.

First Embodiment

Figure 1:
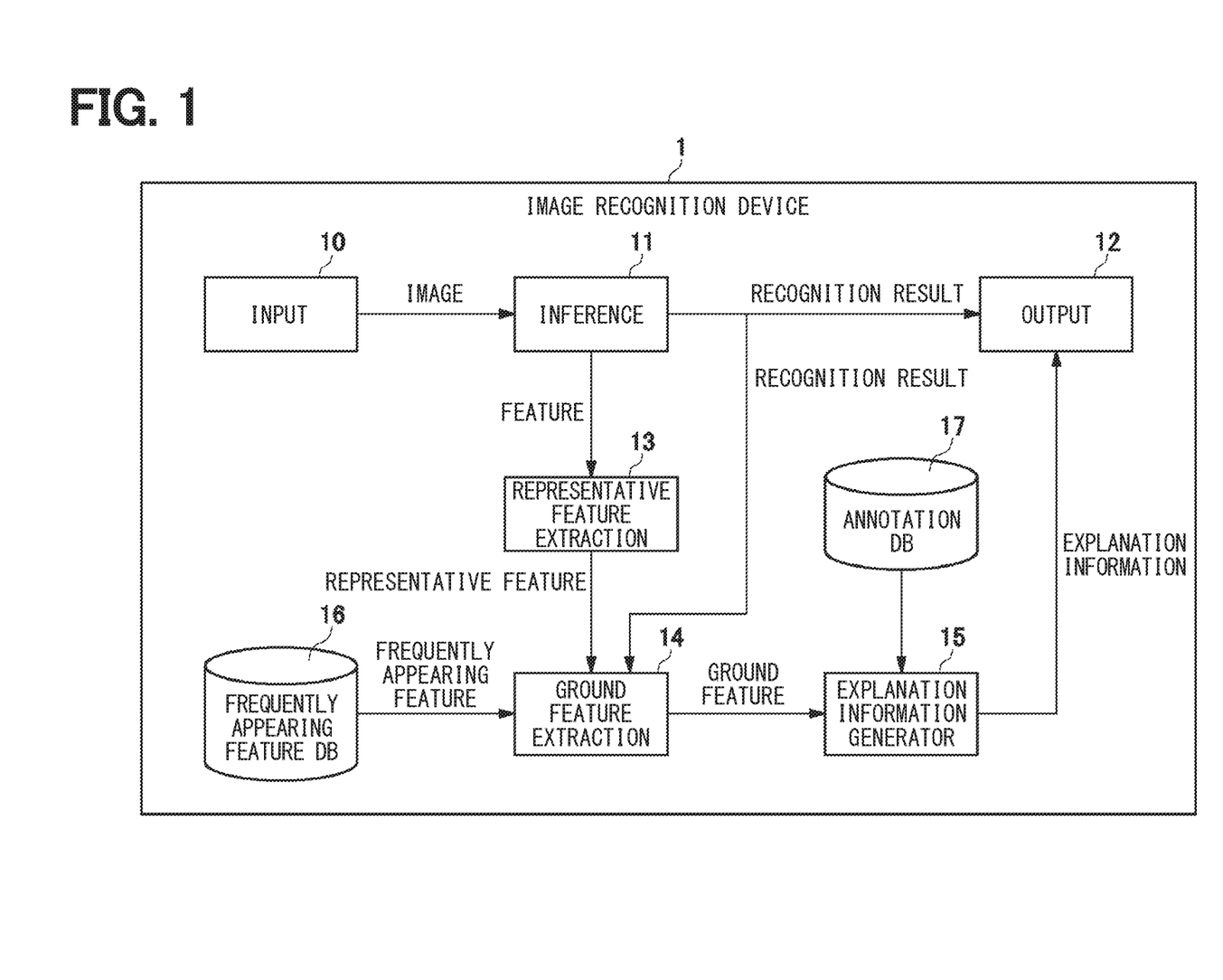
FIG. 1 is a diagram illustrating a configuration of an image recognition device according to a first embodiment.

FIG. 1 is a diagram illustrating a configuration of an image recognition device according to a first embodiment. The image recognition device 1 is a device that infers which of a plurality of classes an input image is classified into. The image recognition device 1 has an input unit 10 for inputting an image as a processing target, an inference unit 11 for inferring a class of an image, and an output unit 12 for displaying and outputting an inference result. The inference unit 11 uses a so-called deep learning neural network model having a plurality of convolutional neural network layers. As an example, a known neural network system called Alex Krizhevsky et al. "AlexNet" may be used. The configuration of the image recognition device 1 described so far may be the same as the configuration of an inference device using a conventional neural network.

The image recognition device 1 according to the first embodiment includes a representative feature extraction unit 13, a ground feature extraction unit 14, and an explanation information generation unit 15. The representative feature extraction unit 13 has a function of acquiring features that appears in the inference process in the inference unit 11 and a function of extracting a representative feature from the features. As a preferred mode, a feature appearing in a layer closest to an output layer of deep learning is acquired. In a deep learning model, the higher the abstraction level of a feature the closer the output layer. Thus, it is considered that the reason for the ground leading to the inference result can be appropriately expressed, and the reason is easily understandable for an user. Here, an example has been described in which a feature appearing in a layer closest to the output layer is obtained. Alternatively, as a modification example, a feature of another layer may be obtained.

The ground feature extraction unit 14 has a function of extracting a ground feature that leads to the inference result of the inference unit 11, based on the representative features extracted by the representative feature extraction unit 13 and data stored in a frequent feature database (hereinafter, referred to as a "frequent feature DB") 16. The representative feature extraction unit 13 and the ground feature extraction unit 14 will be described in more detail.

Figure 2:
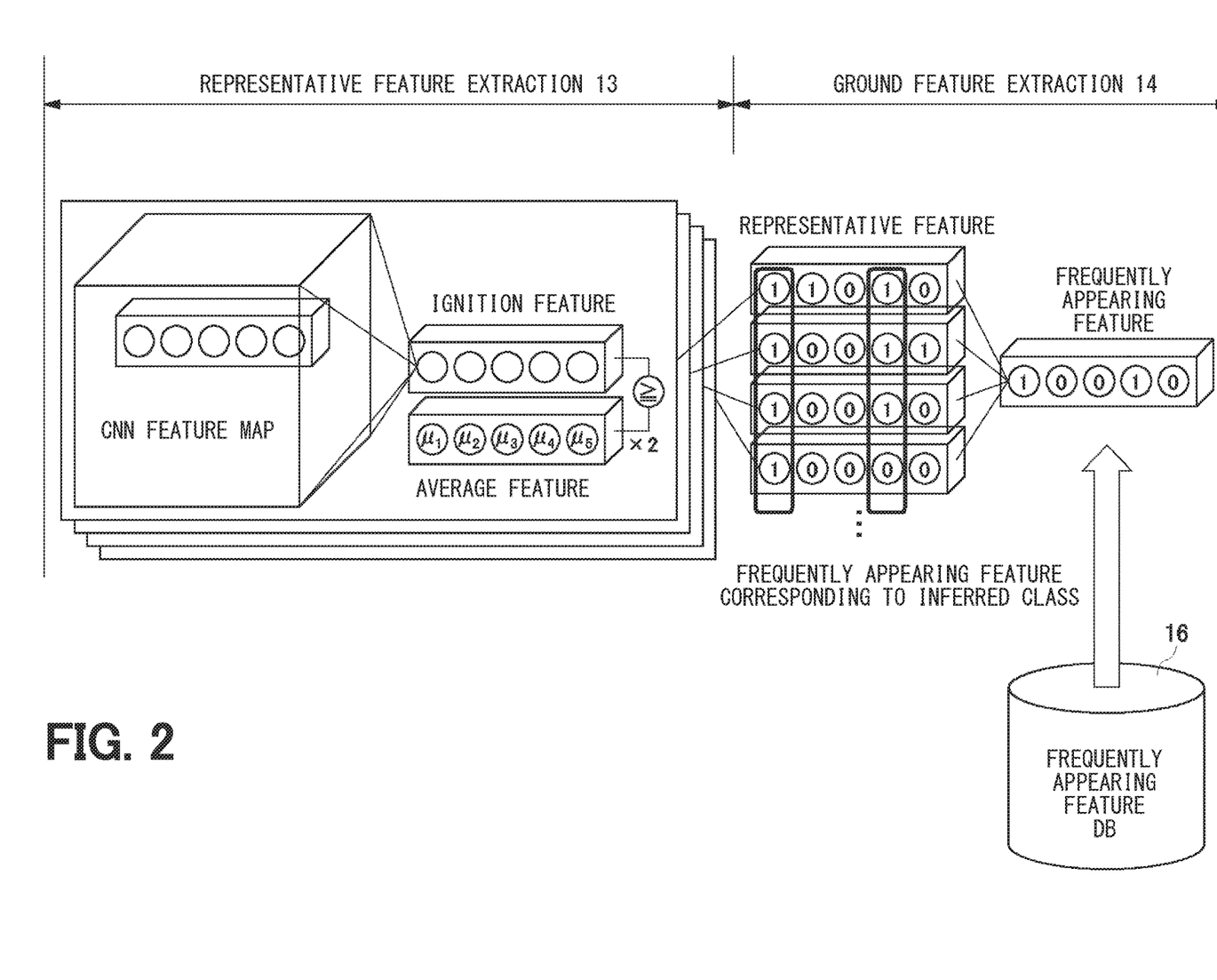
FIG. 2 is a diagram schematically showing the contents of a process by a representative feature extraction unit and a ground feature extraction unit.

FIG. 2 is a diagram schematically showing the contents of a process by a representative feature extraction unit 13 and a ground feature extraction unit 14. The representative feature extraction unit 13 extracts a ignition feature from a feature map of a CNN (i.e., a convolutional neural network) extracted from the inference unit 11. The ignition feature is a feature of the activated neuron.

The representative feature extraction unit 13 has data of an average feature of a large number of images used for generating the neural network model of the inference unit 11. For example, when there are 1000 classes such as "dog", "horse", and "rooster", and each class includes 1300 images, 1.3 million images will be used for learning the neural network model. In this case, the average feature data is the average feature of 1.3 million images of all classes.

The representative feature extraction unit 13 compares the ignition feature with the average feature, and extracts a feature having a particularly large feature value among the ignition features. The features extracted here are referred to as "representative features" in this specification. A condition for determining the representative feature amount is, for example, a feature having a size that is twice or more larger than the average feature. Here, the condition for extracting the representative feature is defined to be twice or more larger than the average feature. Alternatively, the condition for extracting the representative feature may be not limited to be twice the average feature, and may be three times or five times the average feature. The representative feature extraction unit 13 transfers the extracted representative feature to the ground feature extraction unit 14.

When receiving the data of the feature from the inference unit 11, the representative feature extraction unit 13 receives the data of the receptive field corresponding to the feature. When the analysis target is an image as in the present embodiment, the data of the receptive field may be data for specifying a region in the image having the feature.

First, the ground feature extraction unit 14 reads out, from the frequent feature DB 16, the frequent feature in the class related to the image recognition result. That is, as a result of the image recognition, when the input image is determined to be "a rooster", the frequent feature of "a rooster" is read out. Here, the frequently appearing feature is a feature that appears frequently in the image in the class, and can be said to be a feature representing the characteristic of the class. For example, the frequent features of the class "rooster" are "bright red", "needle", "beak", and the like. The ground feature extraction unit 14 extracts a feature common to the representative feature and the frequent feature as a ground feature.

Figure 3:
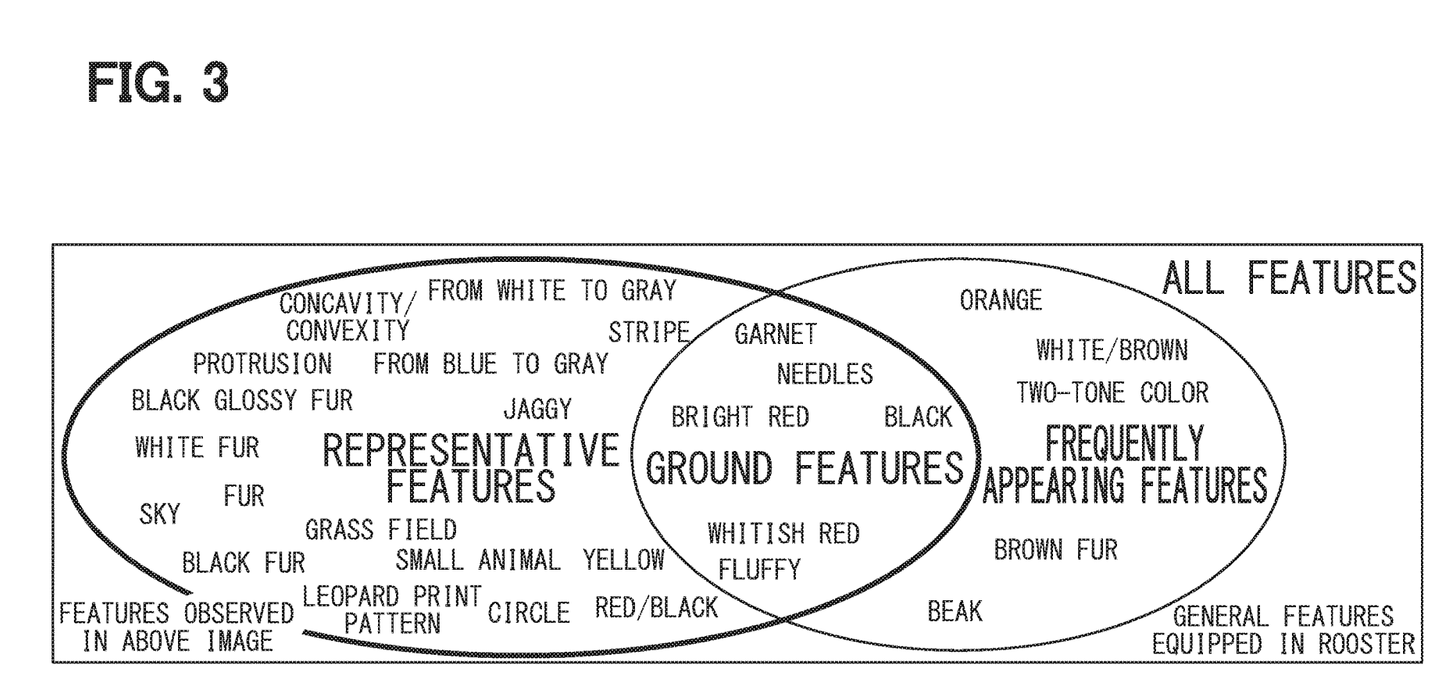
FIG. 3 is a diagram illustrating an example of a ground feature when an image recognition result is "a rooster"

FIG. 3 is a diagram illustrating an example of a ground feature when an image recognition result is "a rooster." In FIG. 3, a set on the left side indicates representative features observed in the image as an analysis target, that is the image input from the input unit 10. In FIG. 3, the set on the right side shows the frequently appearing features of "a rooster," that is the feature often observed in the image of the class "rooster." The ground feature is an overlapping part of the above two sets. The ground feature extraction unit 14 extracts the feature in the overlapping portion of the two sets as the ground feature, and transfers the extracted ground feature to the explanation information generation unit 15. At this time, the ground feature extraction unit 14 transfers the data of the receptive field corresponding to the ground feature to the explanation information generation unit 15.

Returning to FIG. 1, the description of the image recognition device 1 will be continued. When receiving the ground feature from the ground feature extraction unit 14, the explanation information generation unit 15 reads out concept data corresponding to the ground feature from data of an annotation database (hereinafter referred to as "annotation DB") 17, and generates the explanation information.

Figure 4:
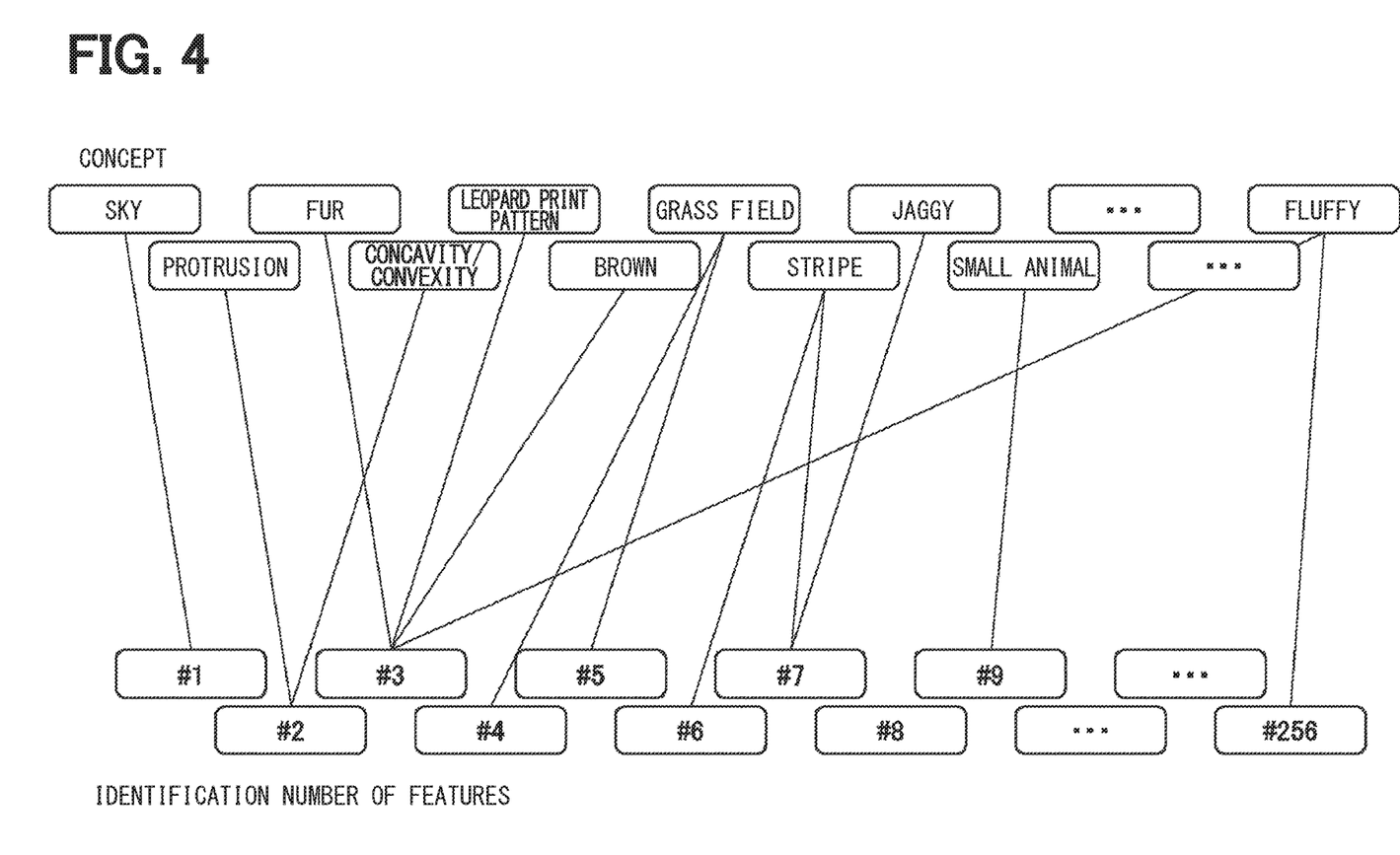
FIG. 4 is a diagram showing an example of data stored in an annotation DB.

FIG. 4 is a diagram showing an example of data stored in an annotation DB 17. The annotation DB 17 stores an identification number for specifying a feature and data of a concept corresponding to the feature, which are in association with each other. For example, the identification number "#1" of the feature is associated with the concept data "sky". Further, the identification number "#2" of the feature is associated with two concept data of "protrusion" and "concavity and convexity." Thus, a plurality of concept data may be associated with one feature. Conversely, the feature data "#4" and "#5" are both associated with the concept data "grass field." Thus, a plurality of symbols may correspond to one concept.

The explanation information generation unit 15 reads out the concept data corresponding to the identification number of the ground feature from the annotation DB 17, and generates a sentence that explains the basis of the inference result using the read-out concept data. For example, when the concept data "sky", "grass field", and "small animal" are read out from the ground features of the identification numbers "#1", "#4", and "#9", the explanation sentence is generated such as "this image is X because the image includes "sky", "grass field" and "small animal." For example, when a plurality of concept data are associated with one ground feature such as identification numbers "#2" and "#7", a description is generated such that a plurality of concepts are connected by "or." For example, a description sentence is generated such that "this image is X because it includes "a projection" or "convexity and concavity" and "a stripe" or "jaggy". Note that the method of expressing the explanation information shown here is an example, and the method of expressing the concept data may be appropriately changed according to the situation to be presented, the attributes of the object person to be presented, and the like. Alternatively, for example, it may be conceivable to increase the visibility by listing items for each concept. The explanation information generation unit 15 transfers the generated explanation information and the data of the receptive field corresponding to the explanation information to the output unit 12.

When there are a large number of features common between the representative features and the frequent features, the explanation information generation unit 15 selects the ground features for using the explanation information so as to match the numerical number of the ground features with the numerical number of the explanation information items (for example, three) to be displayed on the output unit 12. In the present embodiment, the explanation information generation unit 15 selects a predetermined numerical number of ground features from the larger representative feature among the common features.

The output unit 12 displays on the screen a combination of the recognition result of the image inferred by the inference unit 11 and the explanation information generated by the explanation information generation unit 15 together.

Figure 5:
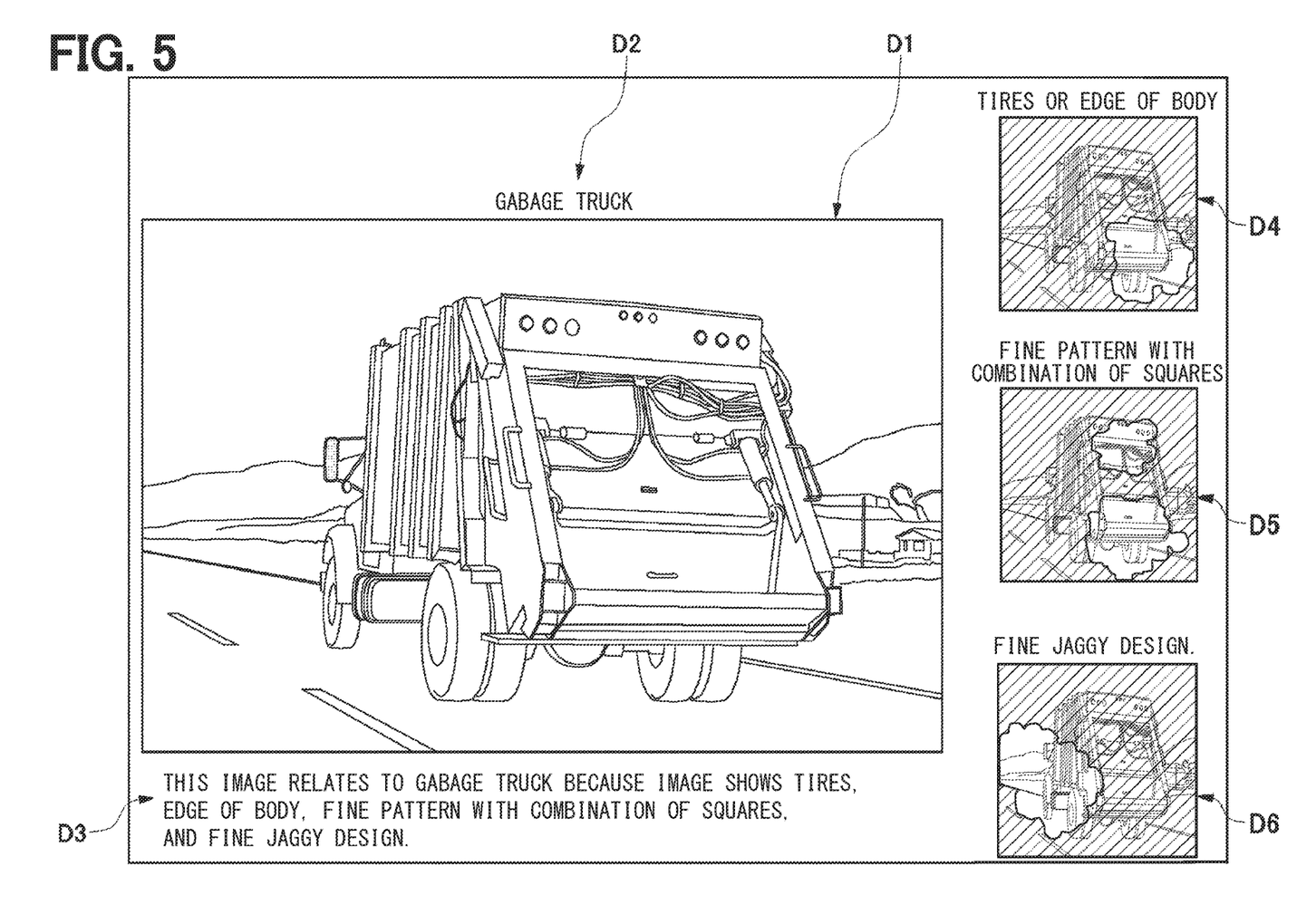
FIG. 5 is a diagram showing a display example of a recognition result.

FIG. 5 is a diagram illustrating an example of a recognition result displayed on a screen by the output unit 12. As shown in FIG. 5, in the output screen of the recognition result, a recognition target image D1 is displayed substantially at the center of the screen, and the recognition result image D2 is displayed on the recognition result image D1, and the explanation information image D3 indicative of the ground for the recognition result is displayed below the image D1.

Further, three images D4 to D6 are displayed on the right side of the image D1 as the recognition target. These images D4 to D6 are images showing the receptive fields corresponding to the explanation information, and the not-hatched part is the receptive field. For example, the top image D4 corresponds to the explanation information indicating that "the tire or the end of an object" is included, and indicates an area in the image determined as such. It is preferable that the three images D4 to D6 are arranged from the top in descending order of the strong ground features. Here, the strength of the representative feature may be used as the strength of the ground feature. As described above, the image recognition device 1 displays not only the recognition result image D2 of the recognition target image D1 but also the basis images D3 and D4 to D6 of the recognition result D2.

Figure 6:
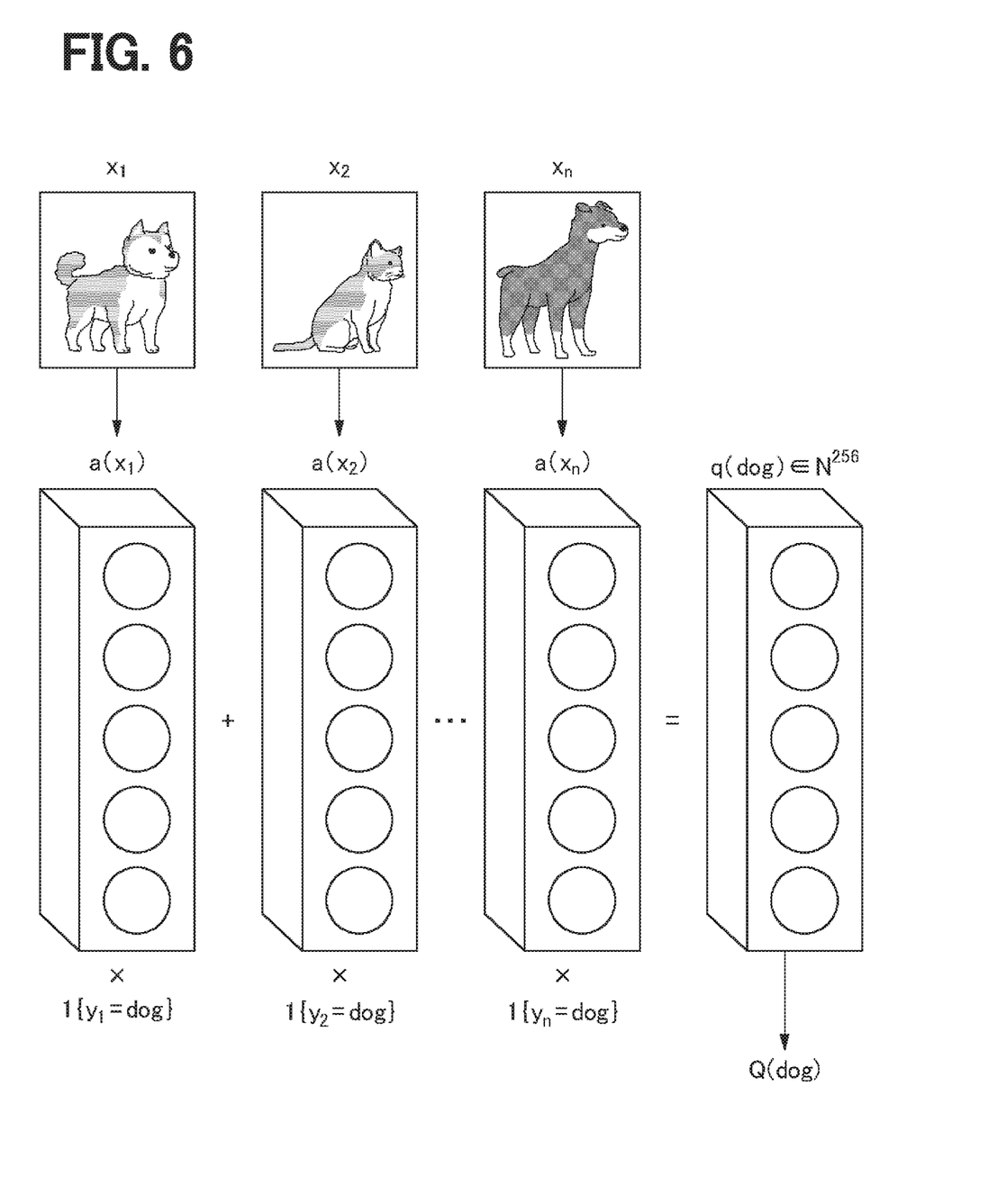
FIG. 6 is a diagram schematically showing a method for obtaining a frequently appearing feature.

Here, a method of generating the frequent feature data stored in the frequent feature DB 16 will be described. FIG. 6 is a diagram schematically showing a method for obtaining a frequently appearing feature. Here, an example is described in which a frequently appearing feature of "dog" is obtained. When the frequently appearing feature for each class is obtained, an image used for learning in the neural network performed by the inference unit 11 (e.g., 1.3 million images having class information in the example described above) is used.

The ignition feature and the average feature are compared for all the images to which the class of "dog" is attached, and the representative feature is obtained by the same method as that described in the above-described representative feature extraction unit 13. In order to perform the calculation for the class of "dog", as shown in FIG. 6, when the label attached to the image is "dog", a process of multiplying "1" by the feature is performed. When the label is not "dog," a process of multiplying "0" by the feature. Through the above-described processing, for each of the images in the "dog" class, the feature determined as the representative feature is obtained among the features (for example, 256 features).

Next, it counts how many images are determined as the representative feature among all images in the "dog" class for each of the features (for example, 256 features). In view of the counts obtained above, for example, the top five features having the larger counts are obtained as the frequent features.

When determining the frequent feature, the representative feature is determined in the same manner as the method described in the representative feature extraction unit 13 because a feature frequently appearing regardless of the class may be determined as a feature in the "dog" class.

The configuration of the image recognition device 1 according to the present embodiment has been described above. An example of the hardware in the image recognition device 1 is a computer including a CPU, a RAM, a ROM, a hard disk, a display, a keyboard, a mouse, a communication interface, and the like. The above-described image recognition device 1 is provided by storing a program having a module for realizing each of the above-described functions in a RAM or a ROM and by executing the program by the CPU. Such a program is also included in the scope of the present disclosure.

Figure 7:
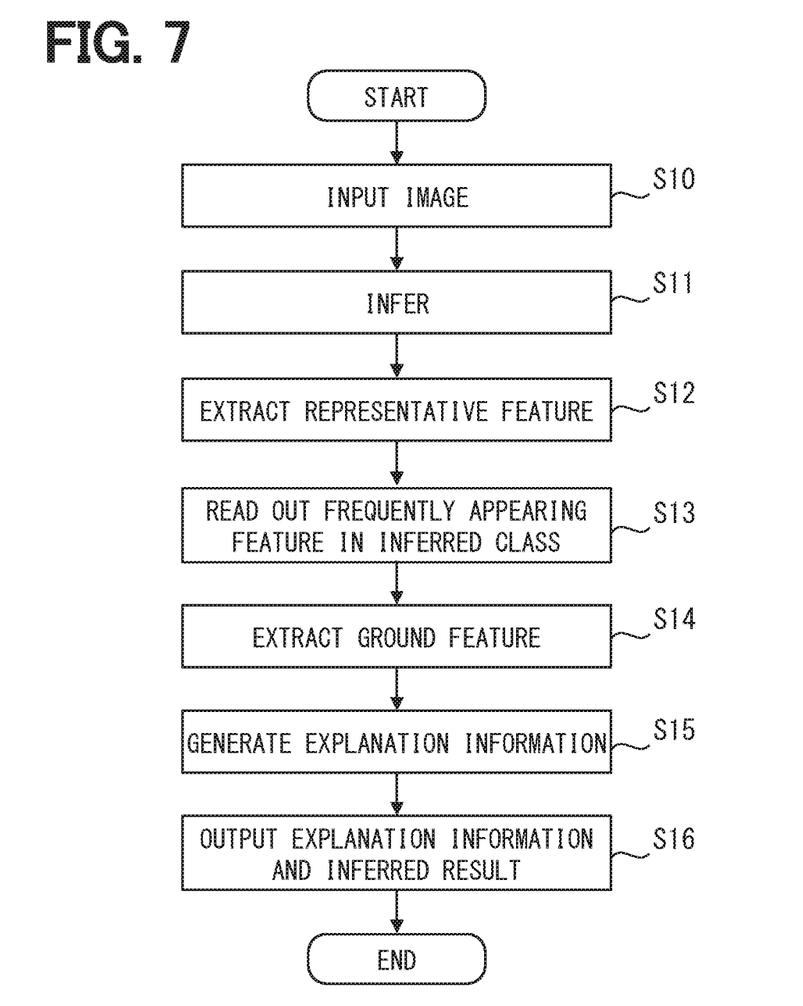
FIG. 7 is a diagram illustrating an operation of the image recognition device according to the first embodiment.

FIG. 7 is a flowchart illustrating the operation of the image recognition device 1 according to the first embodiment. The image recognition device 1 according to the first embodiment receives an input of an image to be recognized by the input unit 10 (at S10). The image recognition device 1 operates the inference unit 11 to perform an inference operation, performs image recognition which class the image belongs to (at S11), and transfers the recognition result to the output unit 12.

The representative feature extraction unit 13 of the image recognition device 1 acquires the feature appearing in the inference process from the inference unit 11, and extracts a representative feature from the acquired features (at S12). The representative feature extraction unit 13 extracts a feature having a magnitude twice or more larger than the average feature as a representative feature. The representative feature extraction unit 13 transfers data of the extracted representative feature to the ground feature extraction unit 14.

Next, the ground feature extraction unit 14 in the image recognition device 1 reads out the frequent feature corresponding to the class inferred by the inference unit 11 (at S13), and extracts the feature common to the frequent feature and the representative feature as the ground feature (at S14). The ground feature extraction unit 14 transfers the obtained data of the ground feature to the explanation information generation unit 15. The explanation information generation unit 15 in the image recognition device 1 reads out the concept data corresponding to the ground feature from the annotation DB 17, generates the explanation information (at S15), and transfers the generated explanation information to the output unit 12. The output unit 12 outputs the inference result received from the inference unit 11 and the explanation information generated by the explanation information generation unit 15 (at S16).

The configuration and operation of the image recognition device 1 according to the first embodiment have been described above. Since the image recognition device 1 according to the first embodiment displays the explanation information generated based on the feature that appears in the actual inference process, the difficulty of the neural network in which the inference process is a black box is solved.

Further, since the image recognition device 1 according to the first embodiment displays the area of the image corresponding to the explanation information, it is possible to grasp which part of the image the explanation information describes, so that the ground for the inference is easily understandable.

Note that the image recognition device 1 according to the first embodiment may output the explanation information that is considered to be a basis for reaching the inference result, but the explanation information may not match the inference result even though the inference result is correct. In such a case, a case may be considered such that the re-learning of the neural network based on the obtained explanation information may be performed. By learning a neural network using an image in a situation similar to the explanation information that does not match the inference result, it is possible to increase the inference accuracy of an image with a type that has not been obtained before.

As a modification example of the image recognition device 1 according to the first embodiment, the ground feature of the inference displayed as the explanation information may be selected so that the receptive field is a different region. That is, when selecting the ground feature to be displayed by the output unit 12, a process is performed so as not to select the ground feature in the same receptive field, instead of simply selecting based on the magnitude of the feature. As a result, the grounds for different regions in the image are displayed, and the conviction for the grounds of the inference is increased.

Second Embodiment

Figure 8:
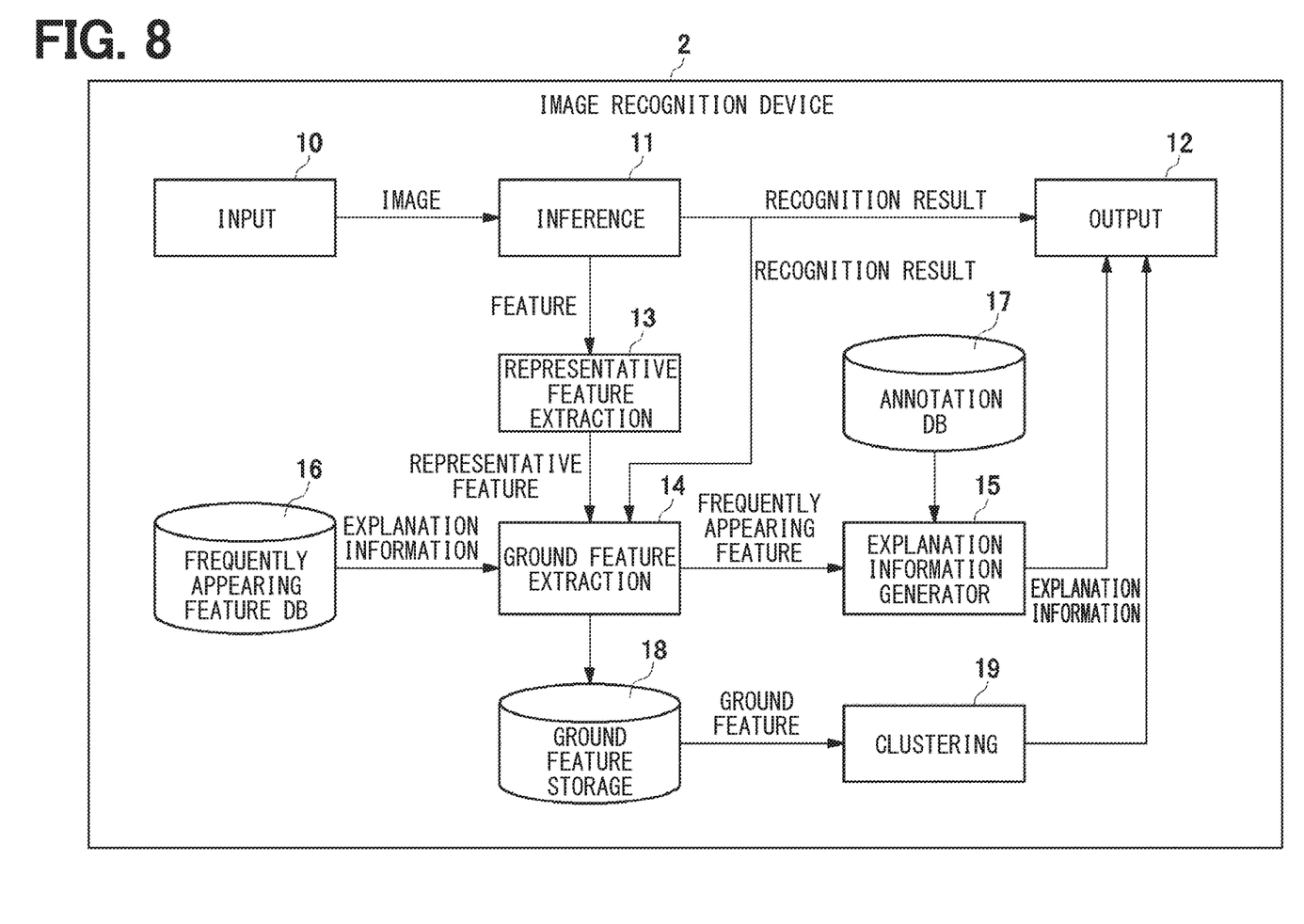
FIG. 8 is a diagram illustrating a configuration of an image recognition device according to a second embodiment.

FIG. 8 is a diagram illustrating a configuration of an image recognition device 2 according to a second embodiment. The configuration for generating the explanation information for explaining a process for reaching the inference result in the image recognition device 2 of the second embodiment is the same as that of the image recognition device 1 of the first embodiment. The image recognition device 2 according to the second embodiment includes a feature that the data of the ground feature obtained by the ground feature extraction unit 14 is stored in the ground feature storage unit 18, and the ground feature is analyzed.

The ground feature storage unit 18 stores ground feature data for each class determined by the inference process. When a predetermined numerical number of inference result data are collected for a predetermined class (for example, "dog"), the clustering unit 19 performs clustering the ground feature. As a result, when the ground feature is classified into a plurality of clusters (for example, two clusters), the data of the clusters is transferred to the output unit 12, and the output unit 12 displays the result of the clustering.

As a result, it is possible to realize that a class previously treated as one class may actually be classified into a plurality of classes. For example, it is possible to notify the possibility that it may be classified into two classes of "small dog" and "large dog" although it has been classified into one class of "dog" previously.

As described above, the inference apparatus according to the present disclosure has been described using the image recognition device 1 and 2 as examples, alternatively, the inference apparatus according to the present disclosure may not be limited to the above-described embodiments.

In the above-described embodiment, the image recognition device 1 and 2 including the explanation information generation unit 15 have been described as an example. Alternatively, the explanation information generation unit 15 may not be an essential feature, and an identification number of the ground feature extracted by the ground feature extraction unit 14 may be output. When the identification number of the ground feature is output, it is possible to evaluate the inference process later using the identification number.

Further, in the image recognition device 1 and 2 of the above-described embodiments, when selecting the explanation information, the explanation information regarding different attributes may be selected. Here, the attributes are, for example, attributes relating to colors, attributes relating to shapes, attributes relating to texture, attributes relating to the category such as animals and inanimate objects, and the like. When displaying the explanation information of different attributes, rather than arranging the explanation information of the same attribute, the user's conviction of the grounds of the inference process is increased.

For example, the following configuration may be considered as a configuration for outputting the explanation information of different attributes. The attribute data is stored in the frequent feature DB 16 in association with the concept data. After extracting the ground feature common to the frequent feature and the representative feature, when the ground feature extraction unit 14 selects the ground feature to be used as the explanation information in descending order of the representative feature value, the ground feature extraction unit 14 does not select a ground feature having the same attribute as the ground feature that has been already selected. For example, when the first priority of the representative feature is "bright red" (in the attribute related to color), the second priority is "black" (in the attribute related to color), and the third priority is "jaggy" (in the attribute related to a shape), the second priority of "black" has the same attribute related to the color as the first priority of "bright red", so that the second priority is not selected as explanation information, and the third priority of "jaggy" is selected.

Further, in the image recognition device 1 and 2 of the above-described embodiments, when the number of ground features is equal to or less than a predetermined threshold number (for example, two or less), the output unit 12 may output this message. When the number of ground features is small, it may be considered that the inference result may be incorrect or it is a special case where the inference result is correct but the frequent features do not appear much in the inference process. By outputting a message such that the number of ground features is small, the user can pay attention to whether the inference result is really correct. Note that the predetermined threshold may be a value that varies for each class. This is because, in some class, the number of frequent features may be small, and in that case, even when the number of ground features is small, it is normal.

The method of generating the frequent feature DB 16 has been described in the above embodiments. Among them, for each image, an example is described such that the ignition feature and the average feature are compared to obtain a representative feature, and the sum of the representative features is obtained. Alternatively, the features of all images in the "dog" class are added, and the addition result and the average feature may be compared. By performing such process, it is possible to obtain data of the strength in frequently appearing features.

By obtaining the data of the strength in the frequent features in this manner, in the above-described embodiments, when the explanation information is arranged and displayed side by side, the explanation information is arranged using the data of the strength in the frequent features. For example, based on the strength of the representative feature and the strength of the frequent feature corresponding to the ground feature, for example, the explanation information (i.e., the ground feature) may be arranged and displayed side by side in the descending order of the sum of the representative feature and the frequent feature.

In the above-described embodiments, a neural network is described as an example of machine learning. Alternatively, the present disclosure may be applied to machine learning for detecting the strength of a feature. For example, in the inference process using a nonlinear SVM (i.e., Support Vector Machine) together with a nonlinear kernel or logistic regression, the reason why an inference result is obtained may be obtained based on a feature appearing in the inference process. In these inferences, since a feature calculated by another method is used as an input, a ground feature may be obtained as follows. First, in the input data itself or a feature vector obtained by a feature extraction algorithm such as HOG or SIFT, a frequently appearing feature is obtained as a frequent feature. Next, also for the input information, the feature is obtained by using the same algorithm as described above, and a feature that satisfies a predetermined condition among the obtained features is used as a representative feature. As a result, a ground feature common to both may be obtained.

As one usage case of the inference apparatus of the present disclosure, application to an autonomous driving vehicle may be considered. The ground feature is obtained in the inference process for determining the driving behavior based on various sensor information in the autonomous driving vehicle, and the explanation information corresponding to the ground feature is continuously recorded.

In such a configuration, it is possible to grasp the reason why the autonomous driving vehicle performs a predetermined driving behavior. This may be used for debugging when the autonomous driving vehicle causes an accident.

Here, the process of the flowchart or the flowchart described in this application includes a plurality of sections (or steps), and each section is expressed as, for example, S10. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure encompasses various modifications and variations within the scope of equivalents. In addition, various combinations and forms, and further, other combinations and forms including only one element, or more or less than these elements are also within the scope and the scope of the present disclosure.

What is claimed is:

1. A method for determining one of a plurality of classes to which an input image belongs in an inference process, the method comprising:
   storing a frequent feature for each class in a frequent feature database;
   inputting an image as the input image;
   extracting which class the input image belongs to;
   extracting a plurality of features that appear in the inference process;
   extracting one of the features that satisfies a predetermined condition as a representative feature;
   reading out the frequent feature corresponding to an extracted class from the frequent feature database;
   extracting one or a plurality of ground features based on the frequent feature and the representative feature;
   storing a concept data representing each feature in an annotation database;
   reading out the concept data corresponding to the one or the plurality of ground features from the annotation database;
   generating explanation information; and
   outputting the ground feature and the explanatory information together with the extracted class.

2. An inference device for inferring which of a predetermined class an input information belongs to using an inference process with an inference model generated by machine learning, the inference device comprising:
   an input unit that inputs information;
   a frequent feature database that stores a feature frequently appearing in the inference process using the inference model as a frequent feature for each class;
   an inference unit that infers which class the input information belongs to, using the inference model;
   a representative feature extraction unit that extracts a plurality of features that appear in the inference process in the inference unit, and extracts one of the features that satisfies a predetermined condition as a representative feature;
   a ground feature calculation unit that reads out the frequent feature corresponding to an inferred class from the frequent feature database, and extracts one or a plurality of ground features based on the frequent feature and the representative feature; and
   an output unit that outputs the ground feature together with the inferred class.

3. The inference device according to claim 2, further comprising:
   an annotation database that stores data of a concept representing the feature; and
   an explanation information generation unit that reads out the data of the concept corresponding to the one or the plurality of ground features from the annotation database, and generates explanation information, wherein:
   the output unit outputs the explanatory information together with the inferred class.

4. The inference device according to claim 2, wherein:
the input unit receives an input of an image as the information;
the ground feature extraction unit extracts data of one or a plurality of receptive fields in the image corresponding to the one or the plurality of ground features together with the one or the plurality of ground features; and
the output unit executes a display for specifying the one or the plurality of receptive fields corresponding to the one or the plurality of ground features in the image.

5. The inference device according to claim 4, wherein:
the ground feature calculation unit obtains the one or the plurality of ground features for the one or the plurality of receptive fields in different areas using the data of the one or the plurality of receptive fields.

6. The inference device according to claim 2, wherein:
the output unit displays the one or the plurality of ground features in a descending order from a strongest representative feature corresponding to the one or the plurality of ground features.

7. The inference device according to claim 2, wherein:
the output unit displays the one or the plurality of ground features side by side based on the frequent feature and the representative feature corresponding to the one or the plurality of ground features.

8. The inference device according to claim 3, wherein:
the annotation database stores attribute data in association with the concept data; and
the ground feature calculation unit obtains the one or the plurality of ground features for different attributes based on the attribute data.

9. The inference device according to claim 2, wherein:
the output unit outputs a message when a numerical number of the one or the plurality of ground features is equal to or less than a predetermined threshold.

10. The inference device according to claim 2, further comprising:
a ground feature storage unit that stores data of the one or the plurality of ground features, calculated by the ground feature calculation unit, for each class;
a clustering unit that performs clustering the one or the plurality of ground features stored in the ground feature storage unit, wherein:
the output unit outputs a message when the clustering unit completes to classify the one or the plurality of ground features.

11. An inference device for inferring which of a predetermined class an input image belongs to using an inference process with an inference model generated by machine learning using a neural network, the inference device comprising:
an input unit for inputting an image;
an inference unit that infers which class the input image belongs to, using the inference model; and
an output unit that outputs, together with an inferred class, a feature which is a basis for determining that the image belongs to the inferred class, wherein
the output unit executed a display for specifying a receptive field corresponding to the feature in the image together with the feature.

12. The inference device according to claim 11, wherein:
the output unit outputs a word representing a concept corresponding to the feature.

13. The inference device according to claim 11, wherein:
the output unit outputs the feature of the basis for the receptive field in different areas.

14. An inference method for inferring which of a predetermined class an input information belongs to using an inference process with an inference model generated by machine learning, the inference method comprising:
by an inference device, extracting which class the input information belongs to using the inference model;
by the inference device, extracting a plurality of features appearing in an inference process, and extracting one of the features satisfying a predetermined condition as a representative feature;
by the inference device, reading out a frequent feature corresponding to an inferred class from a frequent feature database that stores a feature frequently appearing in the inference process using the inference model as the frequent feature for each class;
by the inference device, extracting one or a plurality of ground features based on the frequent feature and the representative feature; and
by the inference device, outputting the ground feature together with the inferred class.

15. A non-transitory tangible computer-readable storage medium comprising instructions being executed by a computer, the instructions including a method for inferring which of a predetermined class an input information belongs to, by an inference device using an inference process with an inference model generated by machine learning, the instructions including:
by an inference device, extracting which class the input information belongs to using the inference model;
by the inference device, extracting a plurality of features appearing in an inference process, and extracting one of the features satisfying a predetermined condition as a representative feature;
by the inference device, reading out a frequent feature corresponding to an inferred class from a frequent feature database that stores a feature frequently appearing in the inference process using the inference model as the frequent feature for each class;
by the inference device, extracting one or a plurality of ground features based on the frequent feature and the representative feature; and
by the inference device, outputting the ground feature together with the inferred class.

* * * * *